United States Patent [19]
Wivagg et al.

[11] Patent Number: 5,421,369
[45] Date of Patent: Jun. 6, 1995

[54] MECHANICALLY ACTUATED PLUG

[75] Inventors: Adrian P. Wivagg, Tolland; James G. Tursi, Newington, both of Conn.

[73] Assignee: Combustion Engineering, Inc., Windsor, Conn.

[21] Appl. No.: 998,670

[22] Filed: Dec. 30, 1992

[51] Int. Cl.⁶ .................... F16L 55/10; G21C 13/00
[52] U.S. Cl. ...................................... 138/89; 376/203
[58] Field of Search ............... 138/89, 93, 94, 98; 165/71; 376/203, 204, 451

[56] References Cited

U.S. PATENT DOCUMENTS

| | | | |
|---|---|---|---|
| 2,670,799 | 3/1954 | Dobbs | 138/89 |
| 2,810,401 | 10/1957 | Stansbury | 138/89 |
| 3,550,636 | 12/1970 | Hearne | 138/89 |
| 3,800,833 | 4/1974 | Young | 138/89 |
| 4,064,912 | 12/1977 | Petrone | 138/89 |
| 4,285,368 | 8/1981 | Terrill | 138/89 |
| 4,548,783 | 10/1985 | Dalke | 138/89 |
| 4,682,631 | 7/1987 | Wilger | 138/89 |

FOREIGN PATENT DOCUMENTS

| | | | |
|---|---|---|---|
| 0112073 | 6/1984 | European Pat. Off. | |
| 3435552 | 4/1986 | Germany | 138/89 |
| 750305 | 7/1980 | U.S.S.R. | 138/89 |
| 8602060 | 4/1986 | WIPO | |

*Primary Examiner*—David A. Scherbel
*Assistant Examiner*—Terrance R. Till
*Attorney, Agent, or Firm*—Ronald P. Kananen; John H. Mulholland

[57] ABSTRACT

A mechanically actuated plug comprises a pole system to lower a pair of seals into a refueling pool in a Boiling Water Reactor ("BWR") plant. A plug adapter is connected to the end of a pole system and is attached to a scissors jack assembly. The scissors jack assembly is comprised of at least one jack screw shaft, at least a pair of nuts, scissor arms connected between the nuts and the seals, and scissor arms connected between the nuts and a loading pad. The pole and plug adapter have a central shaft assembly which is connected to the jack screw shaft and transfers rotational motion from the top of the pole to the jack screw shaft. By rotating the central shaft assembly, the plug may be opened to seal the recirculation line. Once opened, the pole and plug adapter are preferably detached from the plug so that the plug may remain in position while the pole system is removed from the refueling pool. The plug has lifting brackets which aid in the removal of the plug from within the refueling pool and which also prevent the plug from rotating when in the closed position. Preferably, the plug is comprised of a pair of scissors jack assemblies for stabilizing the operations of the plug and for evenly distributing the forces applied both to the seals and to the loading pad.

12 Claims, 9 Drawing Sheets

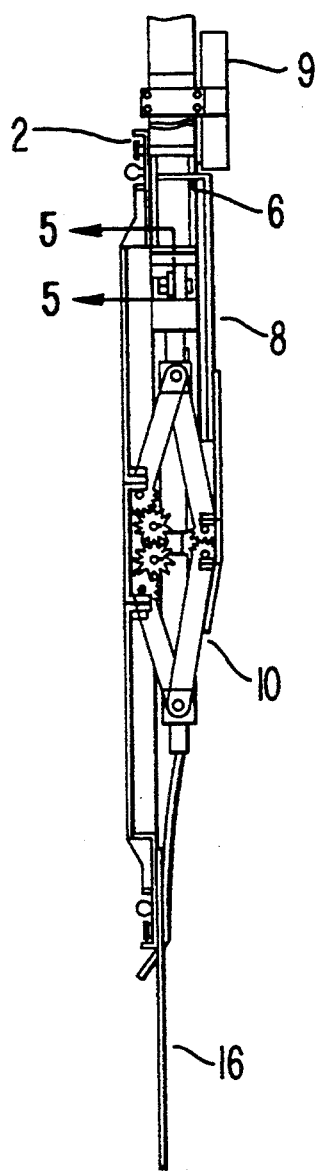
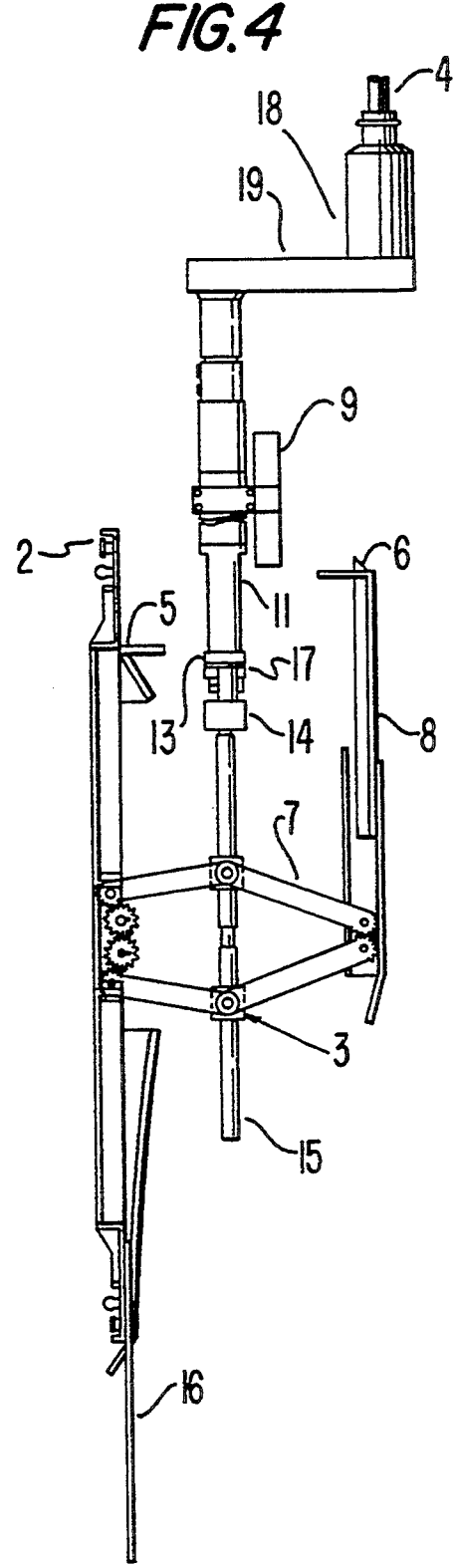
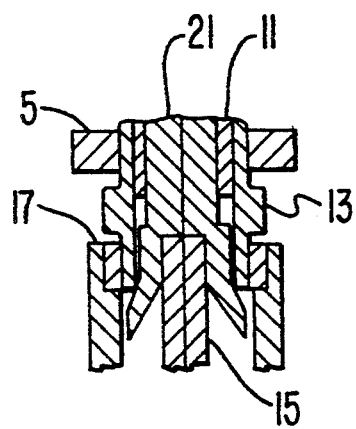
FIG.3
FIG.4
FIG.5

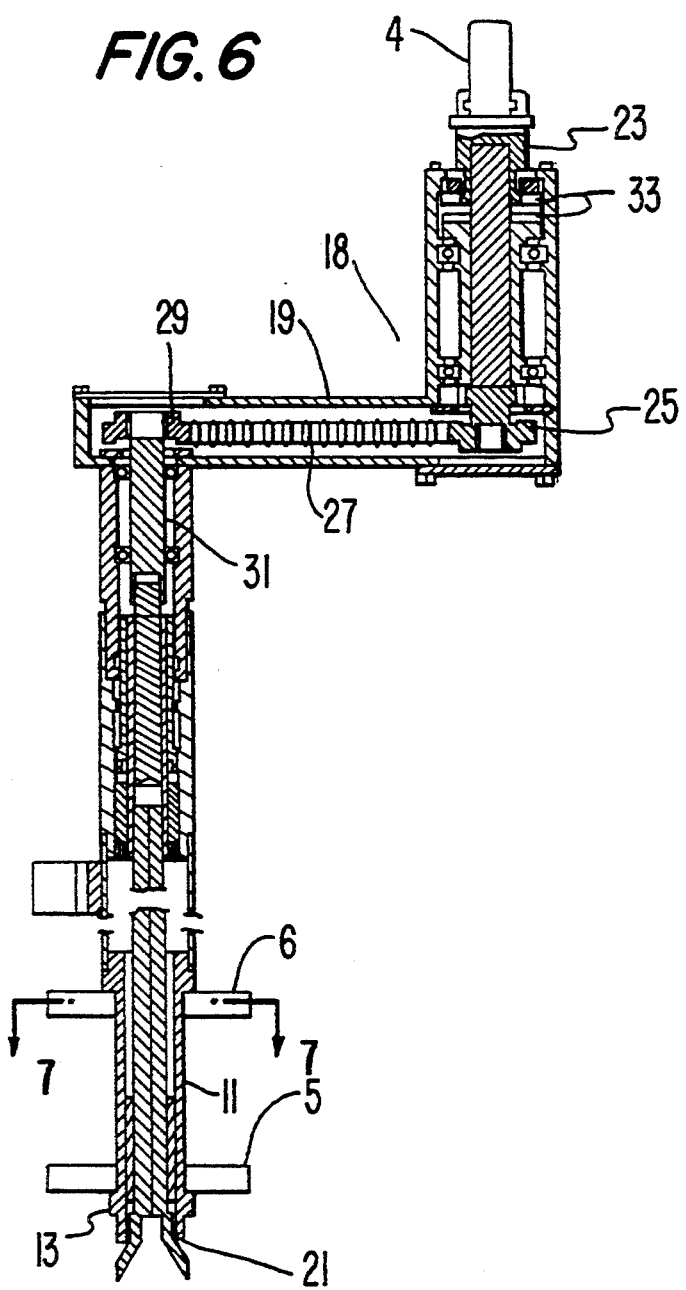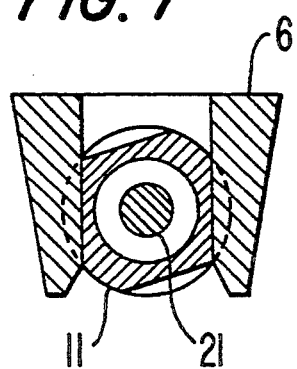

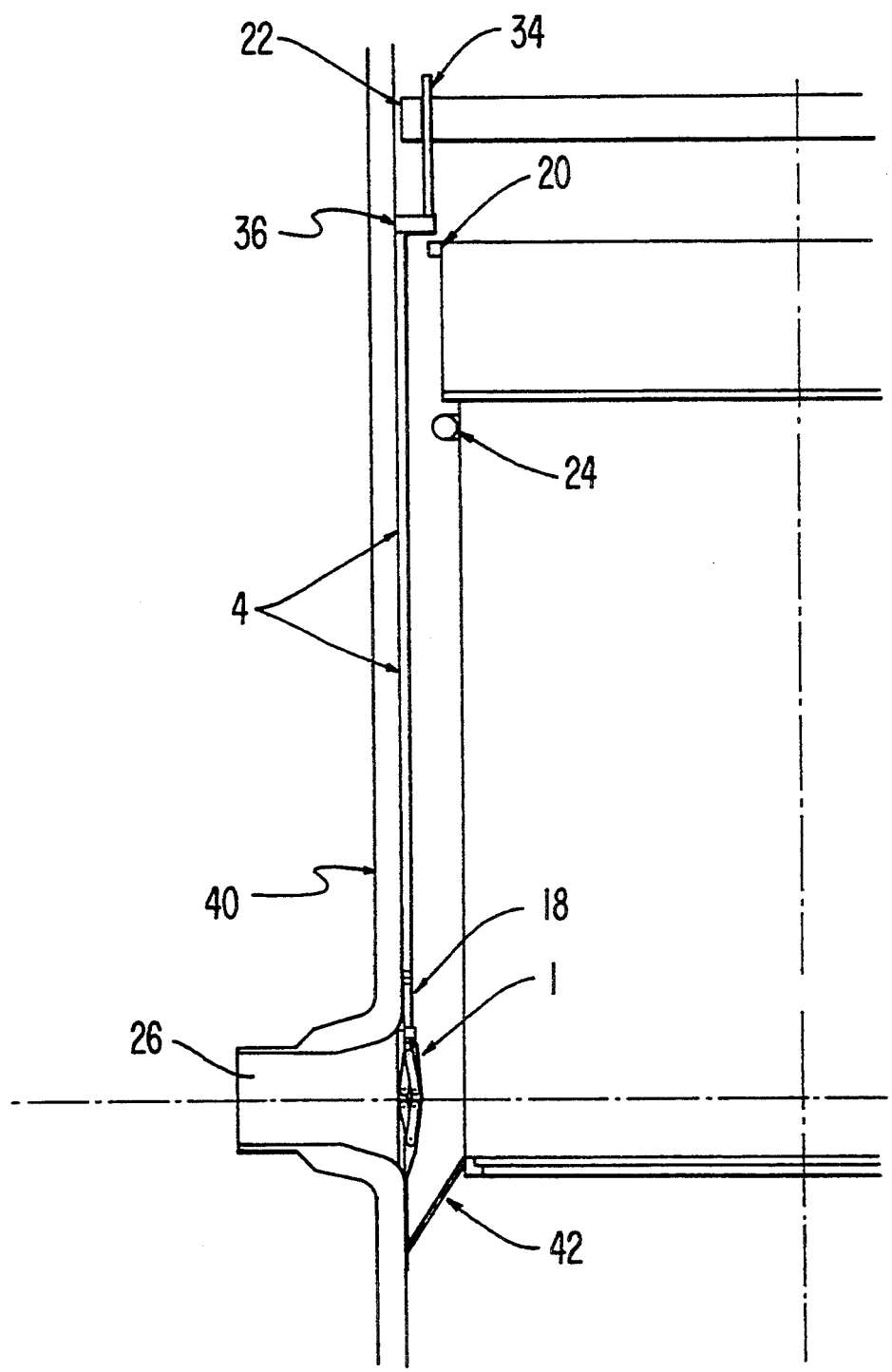

MECHANICALLY ACTUATED PLUG

BACKGROUND OF INVENTION

1. Field of the Invention

This invention relates generally to a mechanically actuated plug and, more particularly, to a mechanically actuated plug for use with a recirculation suction line in a Boiling Water Reactor plant.

2. Description of Prior Art

In a Boiling Water Reactor ("BWR") plant, it is often necessary, for example during maintenance work, to block a recirculation suction line so that the appropriate reactor water level may be maintained during a refueling operation. Typically, a pneumatically controlled plug is used to block the recirculation suction line.

The pneumatically controlled plug is suspended from an electric hoist through stainless steel cables. Once the plug is moved into position over a core shroud, or a reactor annulus, the plug is lowered using the electric hoist. A pneumatically controlled insertion device is then used for inserting the bottom end of the plug into a nozzle of the recirculation suction line.

The pneumatically controlled plug, however, suffers from a disadvantage that several pneumatic lines travel from the plug to a control panel, which is located on the refueling floor level at a location remote from the plug. These pneumatic lines complicate the procedure for installing the plug into position at the recirculation suction line. The pneumatic lines also make the refueling operation difficult since the procedure must be performed while maneuvering around the pneumatic lines.

Furthermore, the hoist lines for manuvering the plug must be "fished" around obstacles in the reactor.

Thus, the plugging of the recirculation suction line is a complicated operation involving the use of pneumatic lines, hoses, connectors, and the control panel. A significant amount of time is consumed in its operation.

SUMMARY OF THE INVENTION

It is an object of the present invention to provide a recirculation suction line plug in a reactor which overcomes these as well as other problems in the prior art.

It is also an object of the present invention to provide a recirculation suction line plug in a BWR which simply and quickly blocks the recirculation suction line.

It is another object of the present invention to provide a recirculation suction line plug which provides a tight seal for the recirculation suction line.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, a recirculation suction line plug comprises at least one sealing member attached to a scissors jack assembly. A loading pad is attached to the opposite side of the scissors jack assembly having scissor arms and engages a load receiving surface when the scissors arms are opened. As a result, when the scissor arms are opened, the sealing member becomes forced against an opening in the line to seal off the line. The sealing member and scissors jack assembly are lowered into position adjacent to an opening in a recirculation suction line with a rigid pole system. The rigid pole system transfers an operating force to the scissors jack assembly in order to open or close the scissors arms.

Preferably, the mechanically actuated plug is comprised of a pair of scissors jack assemblies. The pole system is attached to a shaft in one of the scissors jack assemblies and causes the shaft to rotate. Rotating the shaft in one direction opens the scissors jack assemblies and rotating the shaft in the other direction closes the scissors jack assemblies. The shafts for each scissors jack assembly are interconnected with a chain and sprockets so that rotation of one shaft will operate both shafts.

BRIEF DESCRIPTION OF THE DRAWINGS

The accompanying drawings, which are incorporated in, and form a part of, the specification, illustrate an embodiment of the present invention and, together with the description, serve to explain the principles of the invention. In the drawings:

FIG. 3 is a side view of the plug in a closed position;

FIG. 4 is a side view of the plug in an opened position;

FIG. 5 is a sectional view of FIG. 4 illustrating the connection between the jack assembly and the plug adapter;

FIG. 6 is a sectional view of the plug adapter;

FIG. 7 is a top view of a cross section of the plug adapter and lifting bracket;

FIGS. 9 to 14 illustrate the steps of installing the recirculation suction line plug into a nozzle of the recirculation line.

DETAILED DESCRIPTION OF THE PREFERRED EMBODIMENT

Figure 1:
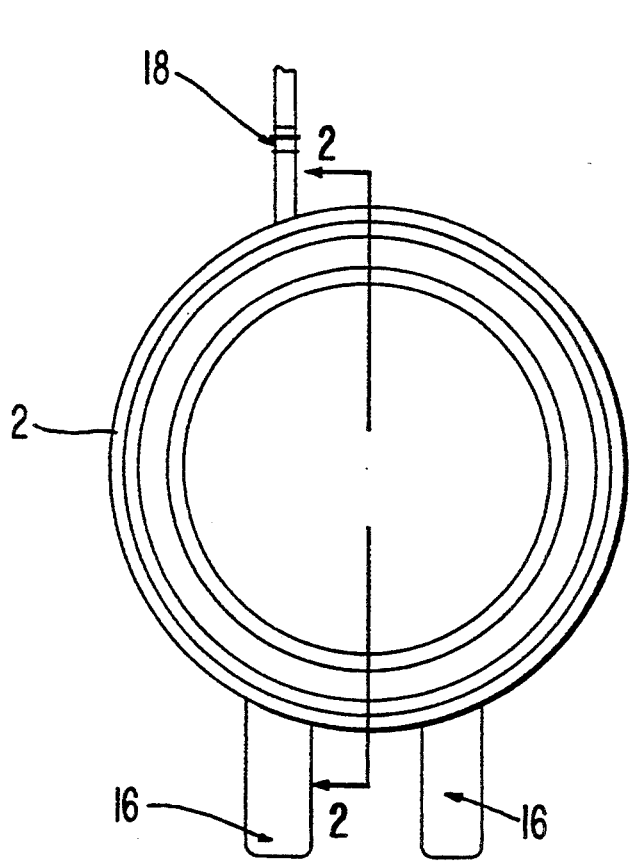
FIG. 1 is a front view of an embodiment of a recirculation suction line plug.
Figure 2:
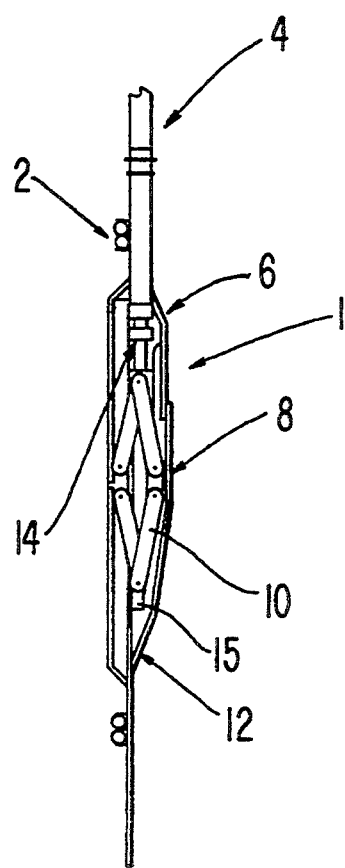
FIG. 2 is a side view of the recirculation suction line plug.

Reference will now be made in detail to the preferred embodiment of the invention, an example of which is illustrated in the accompanying drawings.

With reference to FIGS. 1 to 4, an embodiment of a recirculation suction line plug 1 comprises a pair of circular seals 2 for sealing a recirculation suction line. A rigid pole 4, which is preferably part of a conventional rigid pole handling system, is connected to a plug adapter 18. The pole 4 and plug adapter 18 are used to lower the plug 1 into position for sealing the recirculation line. A camera 9 may be used to aid an operator in placing the plug 1 into position at the recirculation line.

A scissors jack assembly 10 is comprised of a jack screw shaft 15, nuts 3, and scissor arms 7. The scissors arms 7 move the seals 2 and a loading pad 8 in opposite directions when the scissor arms 7 are extended from or drawn to the jack screw shaft 15. The scissor arms 7 are interlocked with gears to prevent downward movement of the plug adaptor 18 due to weight. The jack screw shaft 15 has both left-handed and right-handed threads so that when the shaft 15 is rotated in one direction, the nuts 3 move toward each other and toward the center of the shaft 15 to thereby extend the scissor arms 7. When the shaft 15 is rotated in the opposite direction, the nuts 3 move away from each other and toward the ends of the shaft 15 to thereby contract the scissor arms 7. Consequently, when the shaft 15 is rotated in the one direction, the scissor arms 7 are opened as shown in FIG. 4 and when the shaft 15 is rotated in the opposite direction, the scissor arms 7 are closed as shown in FIG. 3.

As shown in FIG. 5, the jack screw shaft 15 is screwed into a central shaft 21 located within the plug adapter 18. The central shaft 21 has a funnel-shaped end for guiding the central shaft 21 within a socket 17 and over the jack screw shaft 15. When in the closed position, a lifting bracket 5 associated with the seals 2 is keyed into a receiving portion 11 for preventing the jack assembly 10 from rotating. A collar 13 on the plug adapter 18 is positioned below the lifting bracket 5 and engages the lifting bracket 5 when the plug 1 is raised.

With reference to FIG. 6, a central shaft 23 of the plug adapter 18 is connected to the rigid pole 4. The other end of the shaft 23 is connected through a first sprocket 25, chain 27, and a second sprocket 29 to a shaft assembly 31. The central shaft 21 having a funnel-shaped end is located at the opposite end of the shaft assembly 31 from the sprocket 29. As shown in FIG. 7, a lifting bracket 6 associated with the plug 1 is keyed into the receiving portion 11 to prevent the plug 1 from rotating while the scissor arms 7 close to the position shown in FIG. 3. Rotational movement of the plug is controlled by engagement 10 of the clutch 33 until the plug rests on the reactor floor, allowing disengagement due to weight of poles 4 and allowing rotation of sprocket 25.

Figure 8:
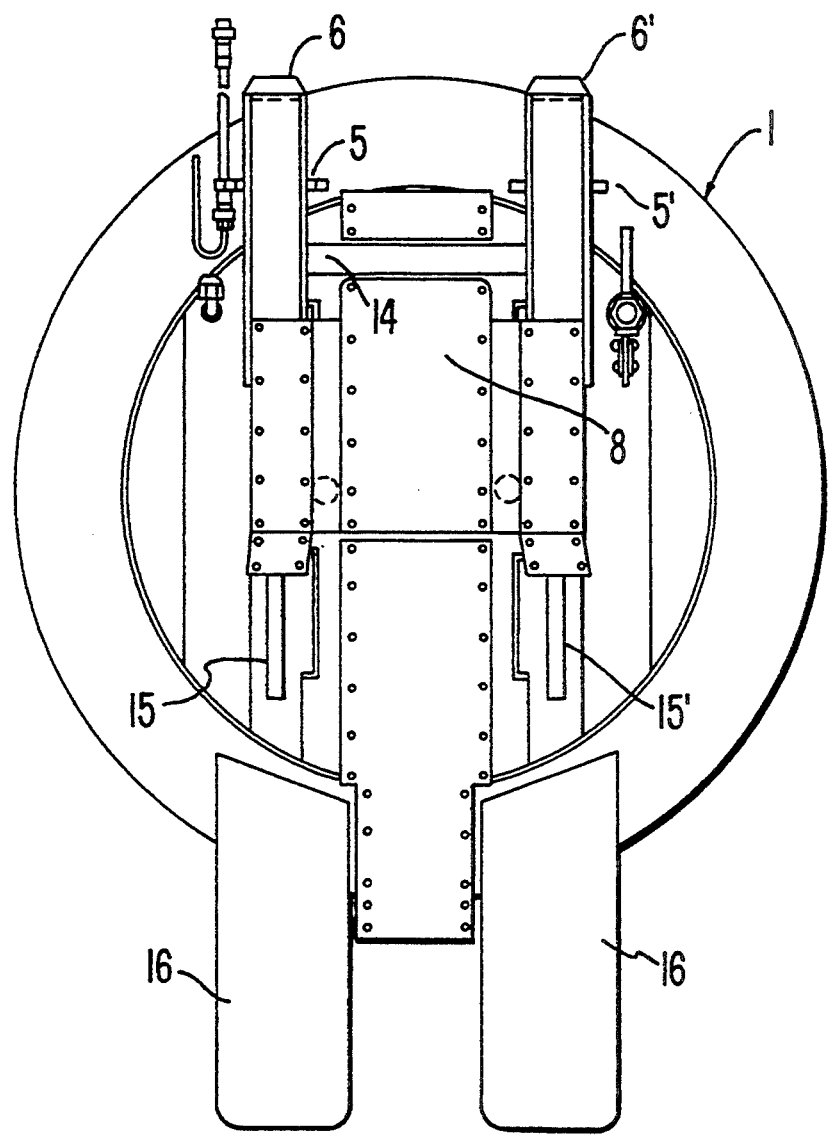
FIG. 8 is a rear view of the plug.

With reference to FIG. 8, the plug 1 preferably has a pair of scissors jack assemblies and jack screw shafts 15 and 15′. Also, the scissors jack assemblies engage with lifting brackets 5 and 5′, which are connected to the plug 1, and lifting brackets 6 and 6′, which are associated with the loading pad 8. A chain and sprocket assembly 14 extends between the two jack screw shafts 15 and 15′ so that the rotation of either jack screw shaft 15 or 15′ will cause both shafts 15 and 15′ to rotate. The use of two jack screw shafts 15 and 15′ stabilizes the opening and closing of the scissors jack assemblies 10 and 10′ and evenly distributes the forces applied to the loading pad 8 and to the seals 2.

The use of two jack screw shafts 15 and 15′ also enables an operator to easily maneuver around obstacles. For instance, when the plug 1 encounters an obstacle within the refueling pool, the plug 1 may be opened and maintained at a certain position within the pool. The operator can then detach the plug 1 from one of the shafts 15 or 15′ and then reattach the plug 1 on the other side of the obstacle and onto the other one of the shafts 15 or 15′.

Figure 9:
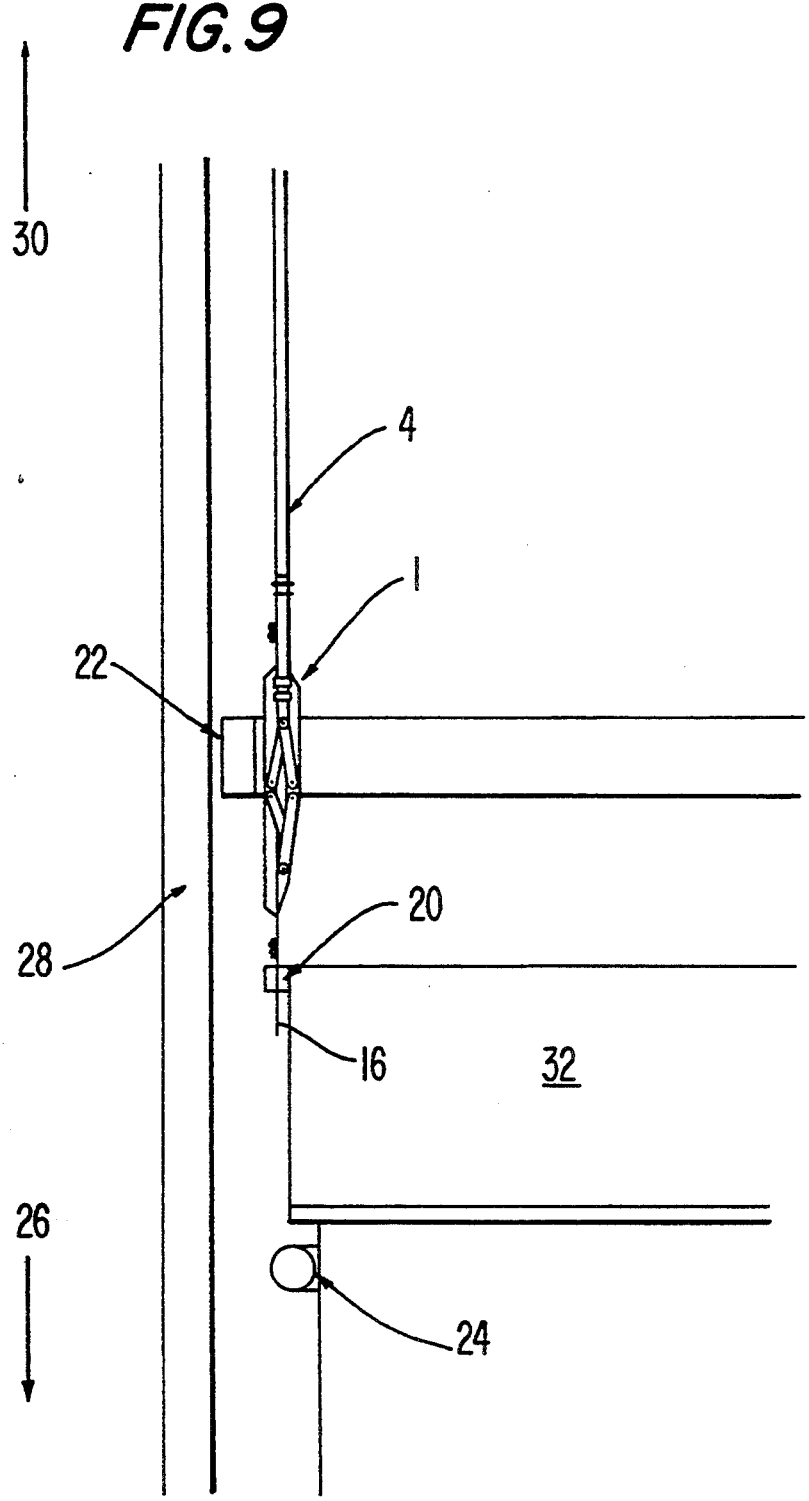

The process of sealing the recirculation line with the recirculation suction line plug 1 is depicted in FIGS. 9 to 14. As shown in FIG. 9, the recirculation line plug 1 is lowered into the refueling pool using the rigid pole 4 until the recirculation suction line plug 1 contacts a lug 20 on a core shroud 32. In this position, the plug 1 is adjacent a feedwater sparger 22 with the legs 16 of the plug 1 straddling the lug 20. The refueling machine 30 is located above the plug 1 while the core spray sparger 24 and the nozzle 26 are located below the plug 1.

Figure 10:
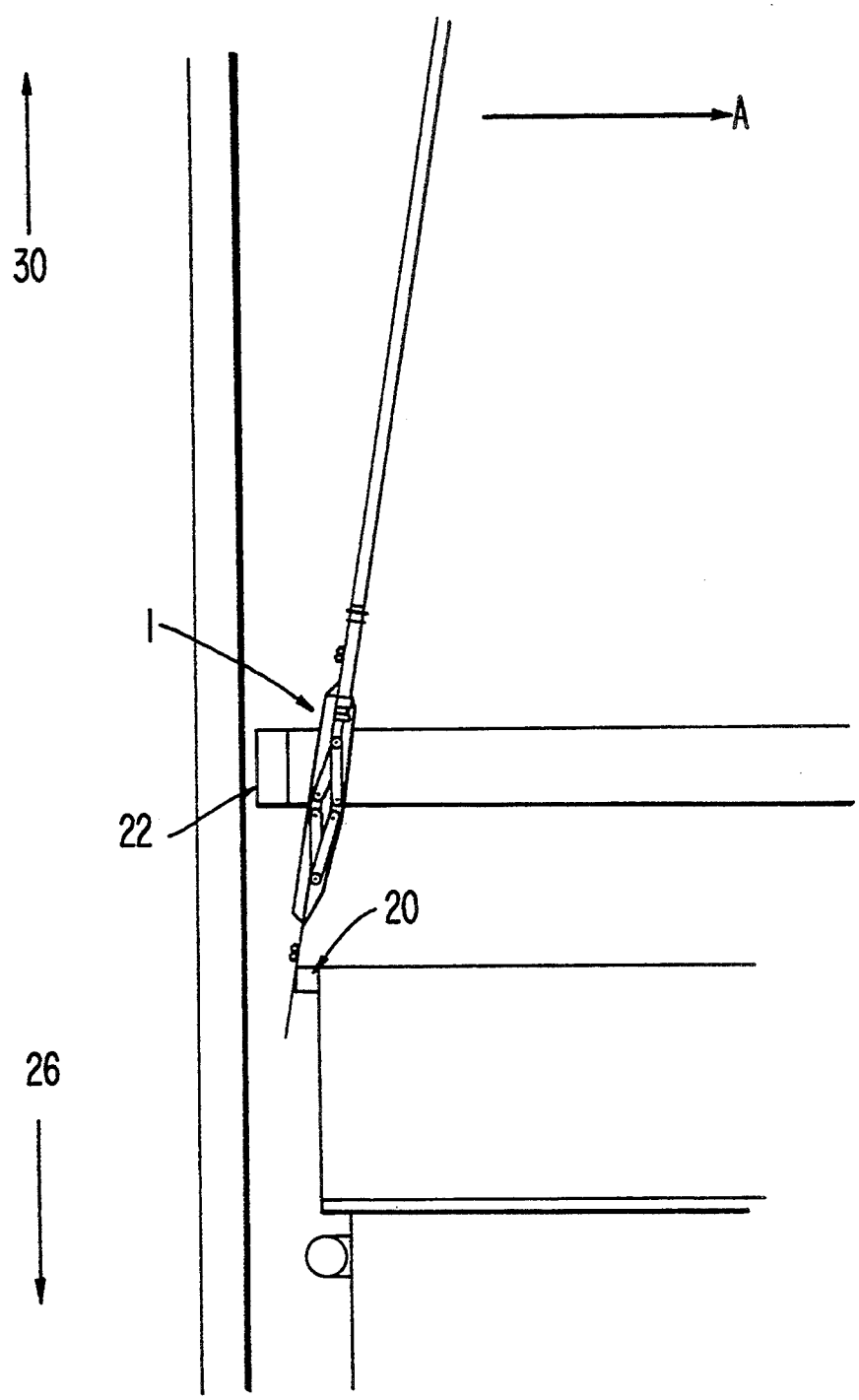
Figure 11:
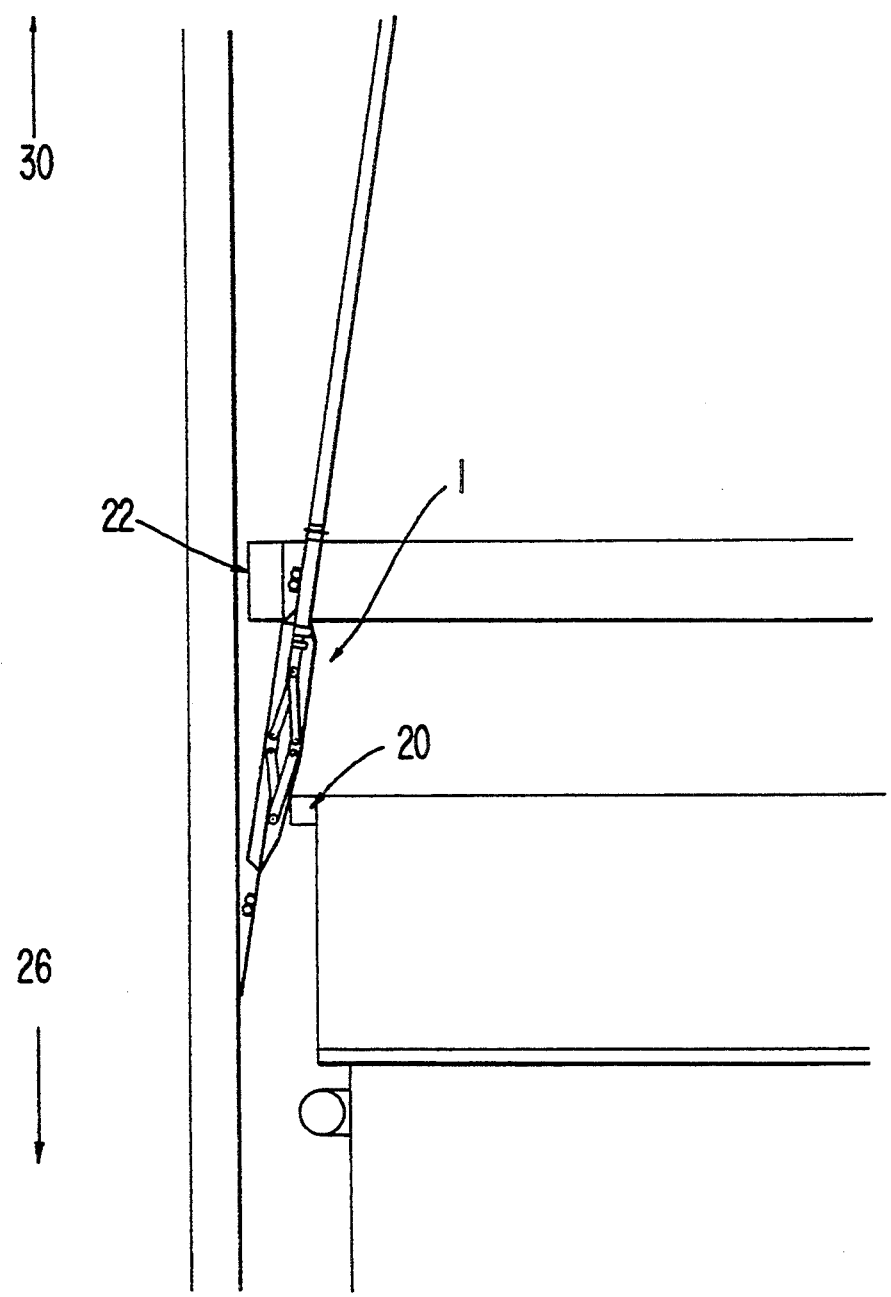

Next, as shown in FIG. 10, the top end of the plug is rotated out to about 10° by moving the top of the rigid pole 4 in the direction A. By placing the plug 1 and pole 4 at this angle, the plug 1 is moved away from the feedwater sparger 22 and the plug 1 can slide off the lug 20. As a result, the plug 1 may be lowered into the annulus between the vessel and the core shroud as shown in FIG. 11. With reference to FIG. 12, rigid poles 4 and an offset gear adapter 36 are used to completely lower the plug 1 until the legs 16 of the plug 1 are in contact with the core support assembly 42. As is apparent from an enlarged view in FIG. 13, the seals 2 of the plug are positioned around the circumference of the nozzle's opening.

In order to seal the recirculation suction line, a central shaft within the rigid pole 34 is rotated. An offset gear adapter 36 connected to the rigid pole 34 causes the central shaft within the rigid pole 4 to rotate. This rotation is transferred through the plug adapter 18, having its own pair of sprockets 25 and 29 and chain 27, and through the chain and sprocket assembly 14 so that both jack screw shafts 15 and 15′ rotate. The jack screw shafts 15 and 15′ cause the scissors jack assemblies 10 and 10′ to either open or close depending upon the direction of rotation of the jack screw shafts 15 and 15′.

Figure 14:
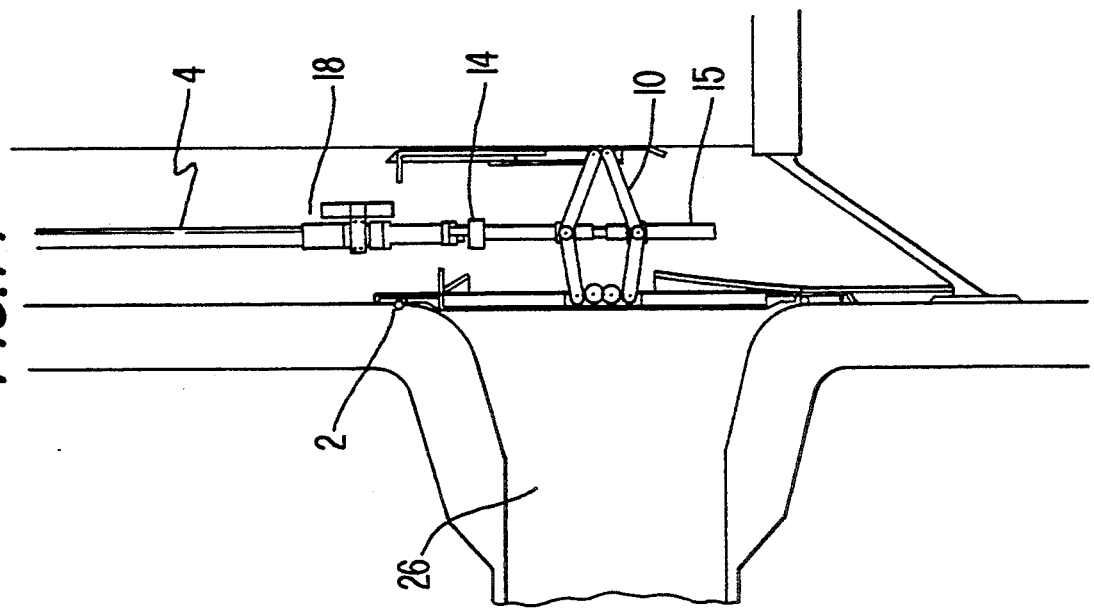
Figure 13:
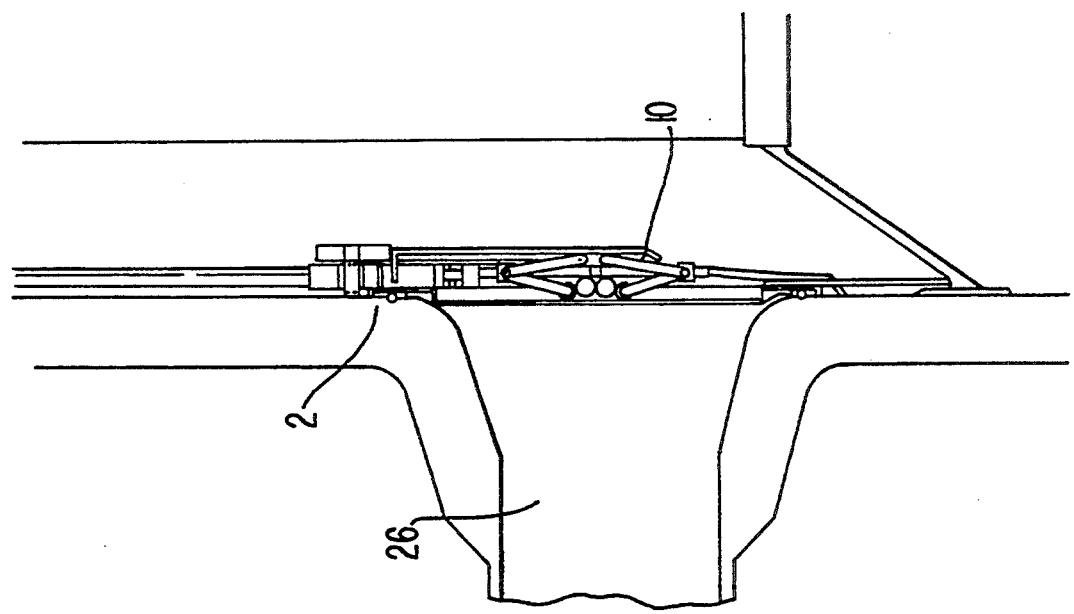

Upon expansion of the scissor arms 7 to an opened position, as shown in FIG. 14, the loading pad 8 is pressed against the core shroud 32 and the seals 2 become pressed against the opening of the nozzle 26 to thereby plug the recirculation suction line. When in the fully opened position, the central shaft 21 of the plug adapter 18 becomes detached from the jack screw shaft 15 so that the poles 4 and plug adapter 18 may be removed from the refueling pool.

After the refueling operation has been completed, the pole 4 and plug adapter 18 may be reattached to the scissors jack assemblies 10 and 10′ so that the plug 1 may be removed from the refueling pool. To reattach the plug 1, the pole 4 and plug adapter 18 are positioned with the aid of a camera 9 so that the funnel-shaped end of the central shaft 21 is lowered over one of the shafts 15 or 15′. Next, the central shaft 21 is rotated to screw the shaft 15 or 15′ into the central shaft 21 and to also rotate the shafts 15 and 15′ so as to close the scissor arms 7 of the scissors jack assemblies 10 and 10′. The lifting brackets 5 and 5′ become keyed into the receiving portion 11 and engage the collar 13 as the plug 1 is being closed. The lifting brackets 6 and 6′ are also keyed into the receiving portion 11. The lifting brackets 5 and 5′ and lifting brackets 6 and 6′ are used to remove the plug 1 from the refueling pool and to prevent the plug 1 from rotating while the scissors jack assemblies 10 and 10′ are closing.

The mechanically actuated plug 1 may be quickly and easily inserted and withdrawn from the refueling pool. As a result of the quick installation and removal time, safety of the operators is improved by reducing their exposure time. The mechanically actuated plug 1 also simplifies the refueling operation since the poles 4 and plug adapter 18 will not act as obstacles during the refueling operation.

The foregoing description of a preferred embodiment of the invention has been presented for purposes of illustration and description. It is not intended to be exhaustive or to limit the invention to the precise form disclosed. Many modifications and variations are possible in light of the above teaching. For example, although the mechanically actuated plug preferably uses a pair of scissors jack assemblies, a single scissors jack assembly or a larger number of scissor jack assemblies are possible. Further, the mechanically actuated plug may be used to seal lines other than just the recirculation suction line. Also, besides sealing lines that carry liquids, the mechanically actuated plug may be used to seal lines that carry gaseous or semi-solid materials as well.

The embodiment was chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

We claim:

1. An apparatus for plugging a fluid line, comprising:
   a sealing member;
   means for pressing said sealing member against said fluid line in response to an operating force initiated from a location remote from said sealing member; and
   means, detachably connected to said pressing means, for positioning said sealing member at an opening of said fluid line and for removing said pressing means from said opening of said fluid line;
   wherein said operating force is transmitted through said positioning means and to said pressing means for causing said sealing member to plug said opening of said fluid line,
   further comprising a lifting bracket on said sealing member to aid in lifting said plug and to prevent rotation of said plug.

2. The apparatus of claim 1, wherein said pressing means comprises a scissors jack assembly secured between said sealing member and said positioning means and having at least one jack screw shaft, at least one pair of nuts, and at least two sets of scissor arms.

3. The apparatus of claim 1, wherein said pressing means further comprises a loading pad which engages a load bearing surface when said sealing member is pressed against said opening of said fluid line.

4. The apparatus of claim 1, wherein said positioning means may be detached from said pressing means after said sealing member is pressed against said line.

5. An apparatus for sealing a recirculation suction line, comprising:
   a sealing member;
   a loading pad;
   a scissors jack assembly connected between said sealing member and said loading pad; and
   a pole system, detachably connected to said scissors jack assembly, for positioning said sealing member at an opening of said line and for removing said sealing member from said opening of said line;
   wherein an operating force is transmitted from a location remote from said sealing member through said pole system to said scissors jack assembly for opening said scissors jack assembly so that said sealing member is pressed against said line and said loading pad is pressed against a load receiving member whereby said opening of said line is plugged, and
   wherein said scissors jack assembly comprises a jack screw shaft, a first nut for traveling between one end of said jack screw shaft and the center of said shaft, a second nut for traveling between the other end of said jack screw shaft and the center of said shaft, a first set of scissor arms connecting said sealing member to said first nut and to said second nut, and a second set of scissor arms connecting said loading pad to said first nut and to said second nut.

6. The apparatus of claim 5, wherein said first set of scissor arms is connected to said second set of scissor arms through said jack screw shaft and through a set of gears whereby a bending torque on said jack screw shaft is prevented.

7. The apparatus of claim 5, wherein said pole system engages said jack screw shaft of said scissors jack assembly and opens or closes said scissors jack assembly with said operating force by rotating said jack screw shaft respectively in either a first direction or a second direction.

8. The apparatus of claim 5, wherein said pole system comprises at least one rigid pole having a rotatable central shaft which engages said jack screw shaft of said scissors jack assembly.

9. An apparatus for sealing a recirculation suction line, comprising:
   a sealing member;
   a loading pad;
   a scissors jack assembly connected between said sealing member and said loading pad;
   a pole system, detachably connected to said scissors jack assembly, for positioning said sealing member at an opening of said line and for removing said sealing member from said opening of said line;
   wherein an operating force is transmitted from a location remote from said sealing member through said pole system to said scissors jack assembly for opening said scissors jack assembly so that said sealing member is pressed against said line and said loading pad is pressed against a load receiving member whereby said opening of said line is plugged, and
   further comprising a first lifting bracket on said sealing member and a second lifting bracket on said loading pad for engaging said scissors jack assembly while said scissors jack assembly is being placed in a closed position.

10. The apparatus of claim 9, wherein said scissors jack assembly comprises a plurality of scissors jack assemblies each receiving a portion of said operating force.

11. The apparatus of claim 5, wherein said pole system becomes detached from said scissors jack assembly when said scissors jack assembly is opened to seal said line.

12. An apparatus for sealing a recirculation suction line, comprising:
    a sealing member;
    a loading pad;
    a scissors jack assembly connected between said sealing member and said loading pad;
    a pole system, detachably connected to said scissors jack assembly, for positioning said sealing member at an opening of said line and for removing said sealing member from said opening of said line;
    wherein an operating force is transmitted from a location remote from said sealing member through said pole system to said scissors jack assembly for opening said scissors jack assembly so that said sealing member is pressed against said line and said loading pad is pressed against a load receiving member whereby said opening of said line is plugged, and
    wherein said pole system comprises at least one plug adapter connected to said scissors jack assembly and at least one rigid pole connected to said plug adapter for lowering said sealing member into position at said opening of said line.

* * * * *